United States Patent [19]
Salley

[11] Patent Number: 6,116,010
[45] Date of Patent: Sep. 12, 2000

[54] KNIFE GUARD FOR A CUTTERBAR ASSEMBLY

[75] Inventor: Gordon Lee Salley, Moline, Ill.

[73] Assignee: Deere & Company, Moline, Ill.

[21] Appl. No.: 09/321,813

[22] Filed: May 28, 1999

[51] Int. Cl.[7] .................................................. A01D 34/13
[52] U.S. Cl. ............................................. 56/257; 56/298
[58] Field of Search .................. 56/297, 296, 259, 56/305, 257, 298, DIG. 17, DIG. 20; 74/60

[56] References Cited

U.S. PATENT DOCUMENTS

| | | | |
|---|---|---|---|
| Re. 33,546 | 3/1991 | O'Halloran | 56/305 |
| 1,424,617 | 8/1922 | Cambell et al. | 56/297 |
| 1,635,050 | 7/1927 | McKellar | 56/275 |
| 1,644,962 | 10/1927 | Swickard | 56/297 |
| 1,647,867 | 11/1927 | Hutsell | 56/259 |
| 2,528,659 | 11/1950 | Krause | 56/298 |
| 3,151,434 | 10/1964 | Hamel | 56/296 |
| 3,444,676 | 5/1969 | Hale et al. | 56/296 |
| 3,463,018 | 8/1969 | Hale et al. | 74/60 |
| 3,508,388 | 4/1970 | Buchholz | 56/297 |
| 3,577,716 | 5/1971 | McCarty | 56/259 |
| 3,715,845 | 2/1973 | Braunberger | 56/305 |
| 3,722,193 | 3/1973 | Strubbe | 56/208 |
| 4,198,803 | 4/1980 | Quick et al. | 56/296 |
| 4,324,092 | 4/1982 | Halls et al. | 56/298 |
| 4,446,683 | 5/1984 | Rempel et al. | 56/296 |
| 4,530,204 | 7/1985 | Brooks | 56/298 |
| 4,575,998 | 3/1986 | Brooks | 56/312 |
| 4,660,360 | 4/1987 | Hardesty et al. | 56/208 |
| 4,660,361 | 4/1987 | Remillard et al. | 56/297 |
| 4,702,064 | 10/1987 | Hunter et al. | 56/312 |
| 4,909,025 | 3/1990 | Reissig et al. | 56/257 |
| 4,909,026 | 3/1990 | Molzahn et al. | 56/298 |
| 4,910,946 | 3/1990 | Underwood | 56/14.4 |
| 5,209,053 | 5/1993 | Verbeek | 56/298 |
| 5,343,682 | 9/1994 | Puncochar | 56/305 |
| 5,694,754 | 12/1997 | Shuknecht et al. | 56/298 |

*Primary Examiner*—Robert E. Pezzuto
*Assistant Examiner*—Arpad Fabian Kovacs

[57] ABSTRACT

An end knife guard for a cutterbar assembly has a body portion forming a lower section and an upper section spaced in relation to one another to define a horizontal slot within which a knife section is confined, and freely movable. The lower section has an inboard lateral side edge that forms a cutting surface. An outboard lateral side edge forms a surface that tapers laterally inward from the forward end of the body portion to form an open area for discharge of trash at the end of the cutterbar assembly. The tapered outboard edge is positioned adjacent to the upright wall of a platform end divider cover. Such that the open area for discharge of trash is between the guard outboard edge and the divider cover, allowing trash to drop from the guard while maintaining the divider cover outer wall close to the end of the cutterbar assembly.

8 Claims, 5 Drawing Sheets

KNIFE GUARD FOR A CUTTERBAR ASSEMBLY

BACKGROUND OF THE INVENTION

1. Field of the Invention

The invention relates to an improved end knife guard for a cutterbar assembly and in particular to the end knife guard of a cutterbar assembly in a harvesting platform and the relationship of the knife guard with a divider cover at the end of the platform.

2. Description of Prior Art

A typical harvesting platform is provided with an elongated cutterbar assembly along a front edge of the platform for cutting a standing crop. The cutterbar assembly comprises a steel support bar, a series of knife guards, a knife back, a series of knives attached to the knife back and a series of hold down clips that hold the knives against the knife guards. The knife guards are mounted to the support bar. Each of the guards is provided with a channel in which the knife back is slidably positioned. In addition, each guard is provided with a slot having ledger plates into which the knives are slidably positioned. A series of triangular knives are bolted to the knife back while the hold down clips are bolted to the support bar and extend forward over the knife back into contact with the knives for holding the knives against the ledger plates of the knife guards. The cutting edges of the knives and the ledger plates cooperate to shear the standing crop.

At the end of a cutterbar assembly, such as the non-driven end, the slot in the guard is open at the end of the cutterbar assembly. Plant material, in the form of trash, collects within the slot. Since the slot is open at the end, the trash is able to move through the slot to the outboard edge of the guard where the trash is discharged from the slot.

Harvesting platforms are equipped with crop dividers at each end of the platform that divide the standing crop, into crop that will be cut by the platform on the present pass and the adjacent crop that will not be cut on the present pass. The crop divider typically includes a cover that forms the body of the divider and covers an end portion of the cutterbar assembly. Since it is desirable to minimize the width of the divider, the outer wall of the cover is closely spaced to the end of the cutterbar assembly. This close spacing can prevent adequate discharge of trash from the slot the end knife guard of the cutterbar assembly.

SUMMARY OF THE INVENTION

Accordingly, it is an object of the present invention to provide an improved end knife guard for a cutterbar assembly which, when positioned closely adjacent to a divider wall, provides adequate discharge of crop material from the knife slot of the guard.

It is a further object of the present invention to provide a divider cover that is easily moved to an open position to provide access to the end of the cutterbar assembly for service operations.

The end knife guard for a cutterbar assembly of the present invention has a body portion forming a channel for receiving the knife back. The body portion further includes a lower section and an upper section spaced in relation to one another to define a horizontal slot therebetween within which a knife section is confined and freely movable. The upper and lower sections are coupled together at the forward end of the body portion. The knife guard further includes a mounting portion integral with the body portion and extending rearwardly therefrom for mounting the guard to the support bar. A guard portion is integrally formed with the body portion and extends forwardly from the forward end of the body portion. The lower section has an inboard lateral side edge that forms a cutting surface with the immediate adjacent knife section. An outboard lateral side edge tapers laterally inward from the forward end of the body portion toward the channel, thereby forming an open area for trash to fall at the end of the cutterbar assembly. The tapered outboard edge is positioned adjacent to the upright wall of the cover. As a result of the taper, a downward open area is formed allowing trash to drop from the guard.

The divider includes a ground engaging skid plate and a cover mounting post that extends upwardly from the skid plate. The divider cover is pivotally mounted to the upper end of the post. An over-center spring is coupled to the post and the cover to bias the cover downward against the skid plate in a lowered use position as well as to bias the cover upward, in a raised, open position, to access the end of the cutterbar assembly.

DESCRIPTION OF THE PREFERRED EMBODIMENT

Figure 1:
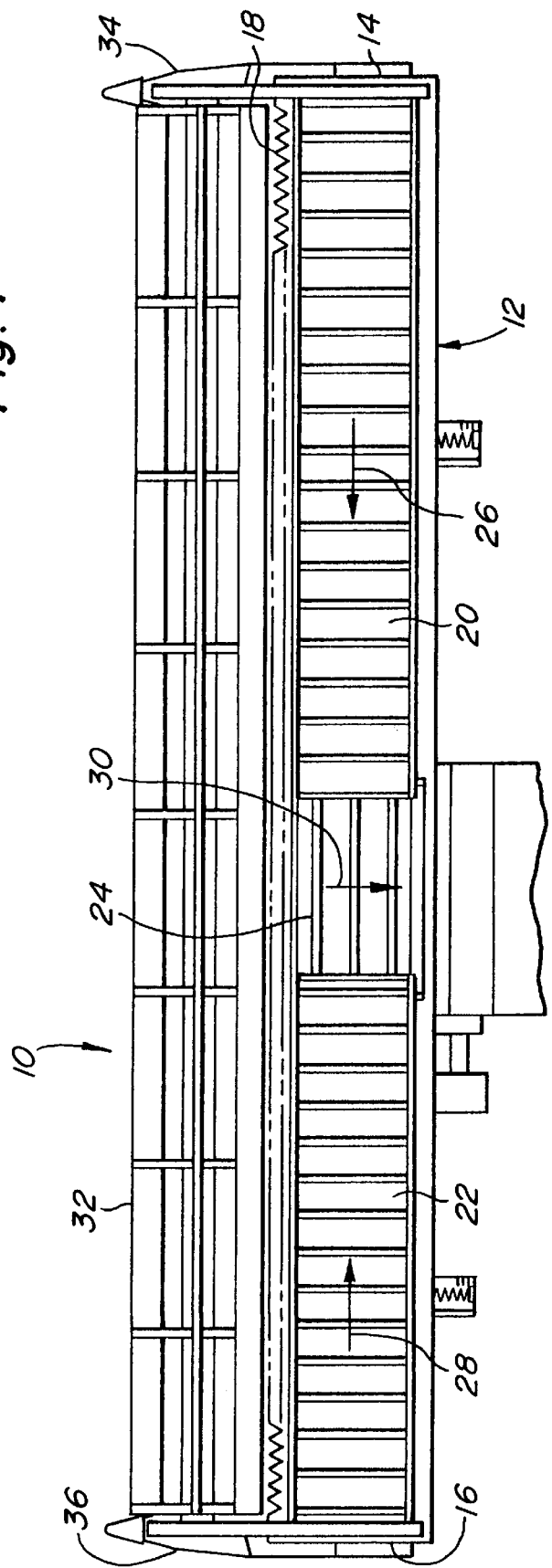
FIG. 1 is a plan view of a harvesting platform having the end guard for the cutterbar assembly of the present invention.

The end knife guard of a cutterbar assembly of the present invention is embodied in the draper platform 10 shown in FIG. 1. The platform 10 includes a frame structure indicated generally at 12. The frame structure 12 has opposite ends 14 and 16. A cutterbar assembly 18 extends between the opposite ends along a forward edge of the platform. The platform 10 further includes three draper belts, side draper belts 20 and 22 and a center feed draper belt 24. The two side draper belts 20 and 22 move crop material laterally, toward the center of the platform, as shown by the arrows 26 and 28. The center draper belt 24 moves crop material rearward into a harvesting machine as shown by the arrow 30. A reel 32 rotates above the cutterbar assembly 18 to hold the standing crop against the cutterbar assembly 18 and to move the cut crop material onto the draper belts. While the end knife guard of the present invention is shown in a cutterbar assembly for a draper platform, it can also be used in cutterbar assemblies for other types of implements.

The platform ends 14 and 16 include dividers 34 and 36 respectively. The dividers each include a lower, ground engaging skid plate 38 and a cover 40 carried above the skid plate. The divider is shown and described in greater detail below.

Figure 2:
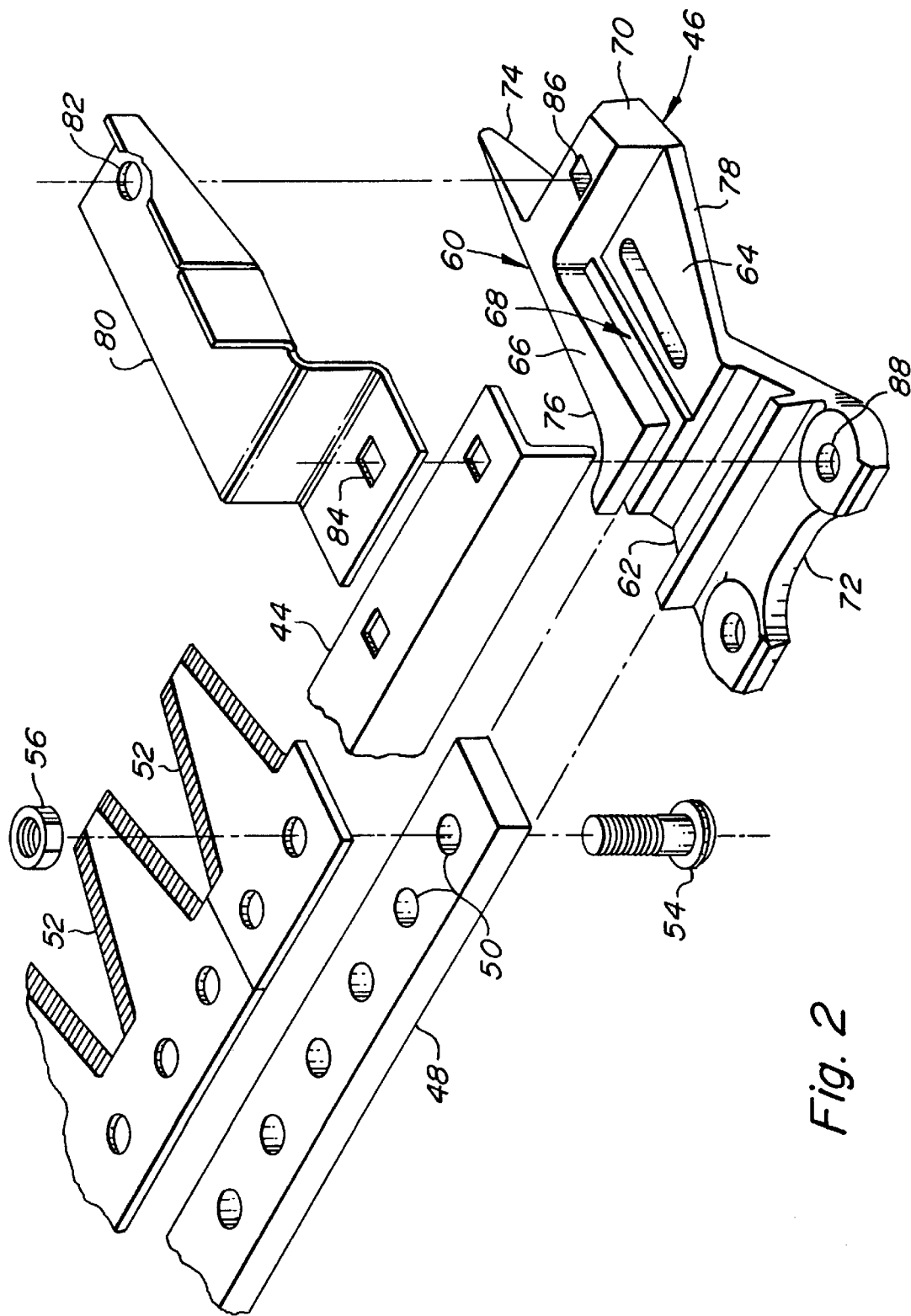
FIG. 2 is an exploded perspective view of an end section of the cutterbar assembly.

The cutterbar assembly 18 is shown with reference to FIG. 2. The cutterbar assembly includes a support bar 44 to which the end knife guard 46 is mounted. An elongated knife back 48 is provided with a series of knife mounting holes 50. The support bar 44 and the knife back 48 extend transversely to the travel direction of the supporting machine. A series of knife sections 52, only two of which are shown, are bolted to the knife back by mounting bolts 54 and nuts 56.

The end knife guard 46 has a body portion 60, which has a channel 62 for receiving the knife back 48. The body portion 60 is formed by a lower section 64 and an upper section 66. The lower and upper sections 64, 66 are in spaced relation to one another to define a horizontal knife slot 68 therebetween, within which a knife section 52 is confined and moveable therein. The upper and lower sections are coupled to one another at the forward end 70 of the guard body portion. A mounting portion 72 is integrally formed with the body portion 60 and extends rearwardly therefrom, behind the channel 62, for mounting the guard to the support bar 44. A guard portion 74 is integrally formed with the body portion 60 and extends forwardly therefrom.

The end guard 46 is placed at the end of the cutterbar assembly as shown in the figures. The lower section 64 and upper section 66 form an inboard edge 76 of the guard. The lower section 64 extends outwardly beyond the upper section 66 and forms an outboard edge 78. A removable knife cover 80 is placed over the knife, outboard of the upper section 66, covering the knife and the lower section 64. The cover 80 has two apertures 82, 84 for attaching the knife cover 80 to the end knife guard 46 through apertures 86, 88 in the end knife guard. The cover is removable to access the fasteners attaching the knife sections 52 to the knife back in the channel 62. If desired, the cover can be integrally formed as part of the upper section of the body portion 60. In this case, it would not extend over the channel to provide access to the hardware attaching the knife sections to the knife back.

The inboard edge 76 of the guard forms a cutting surface 90 below the slot 68 whereby crop material between the cutting surface 90 and the knife section is sheared as the knife section reciprocates through the slot 68.

The divider cover 40 has a use position in which it covers the end portion of the cutterbar assembly. The cover 40 includes an upright outer wall 92 positioned adjacent to the end knife guard 46. Since the upright outer wall 92 is closely spaced to the end guard, any plant material that is forced into the slot 68 in the end guard has difficulty being discharged through the outboard end of the slot 68. The end guard 46 of the present invention provides an escape path for trash in the slot 68 by forming the outboard edge 78 such that it tapers inward, as it extends rearward from the forward end 70 of the body portion. This forms an open area 94 in the lower section of the guard, beneath the knife, for discharge of trash from the slot 68. The lower section 64 further includes a secondary opening 96 to provide an additional discharge for trash from the slot 68. Once trash is discharged from the cutterbar assembly, the trash falls to the skid plate 38 where vibrations etc. move the trash reward off the skid plate.

Figure 3:
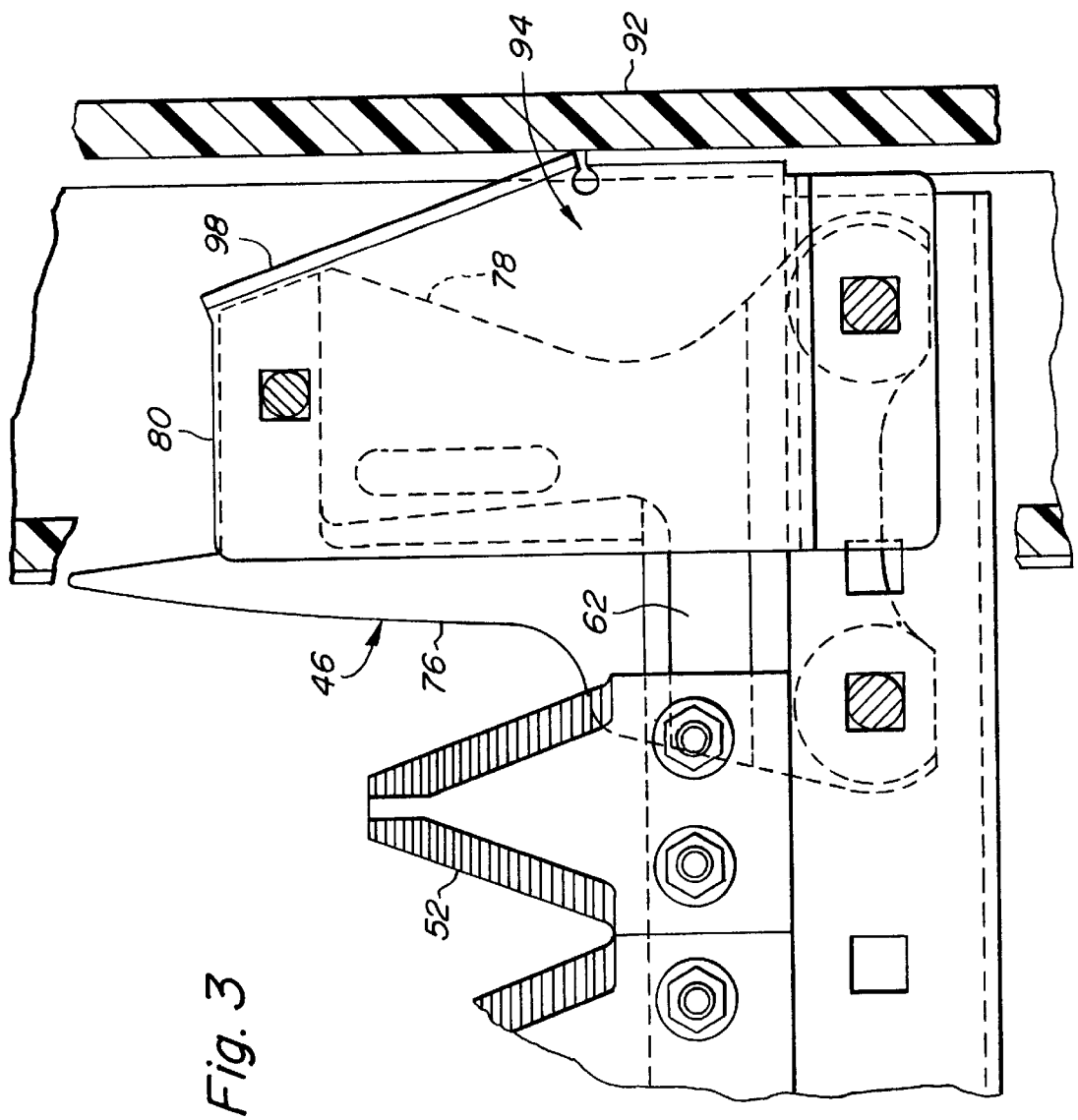
FIG. 3 is a top plan view of the end section of the cutterbar assembly.
Figure 4:
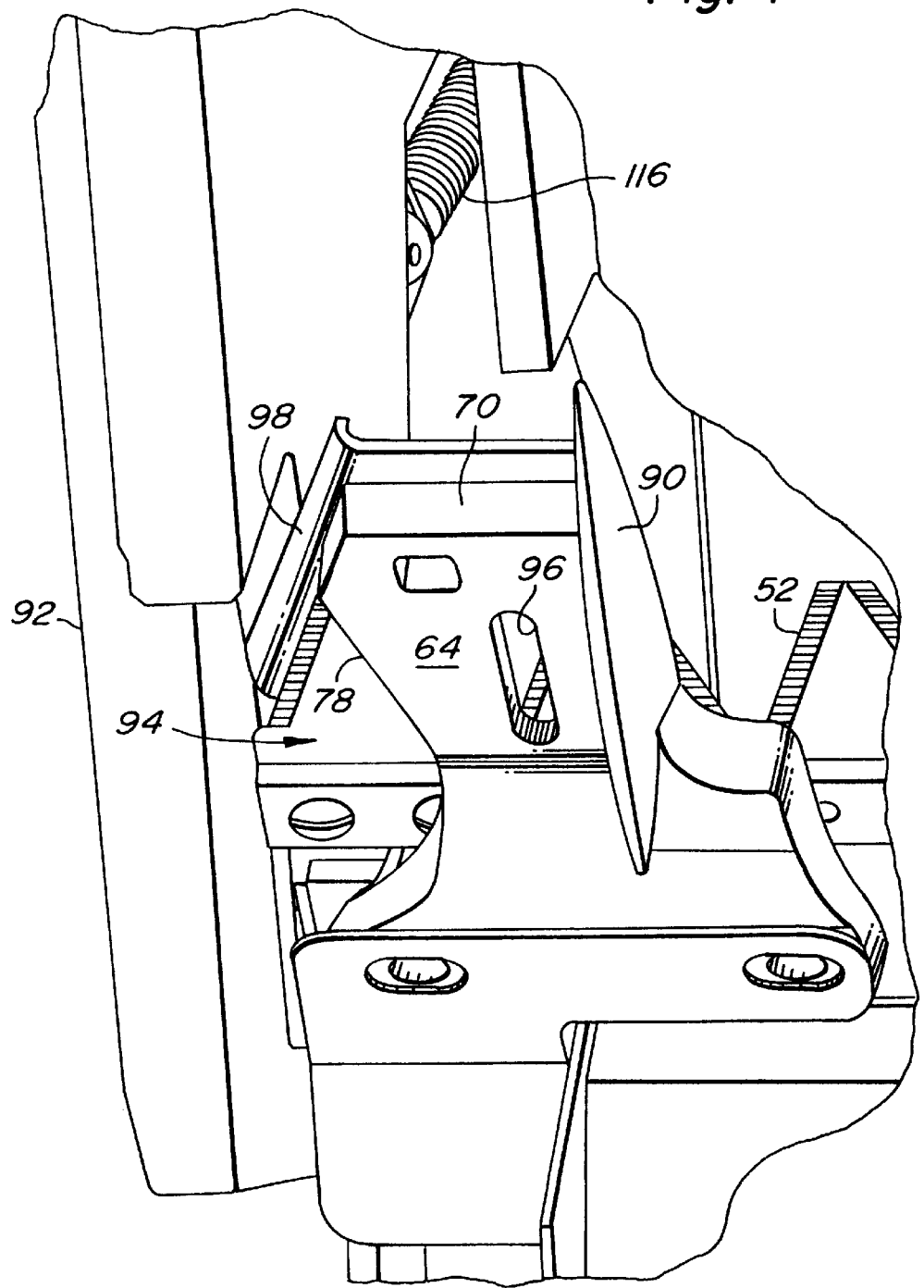
FIG. 4 is a bottom view of the end section of the cutterbar assembly.

The removable knife cover 80 extends outwardly from the upper section 66, covering the knife section and forming the continuation of the upper wall of the slot 68. The knife cover 80 has an outboard edge 98 that tapers outwardly and rearwardly from the forward end 70 of the guard body portion. The edge of the knife cover 80 generally follows the profile of the knife sections 52. The knife cover 80 thus overhangs the open area 94 formed by the lower section 64 as shown in FIGS. 3 and 4. The outer wall 92 of the divider cover rests against the outboard edge of the cover 80 to ensure that the wall 92 is not contacted by the knife.

Figure 5:
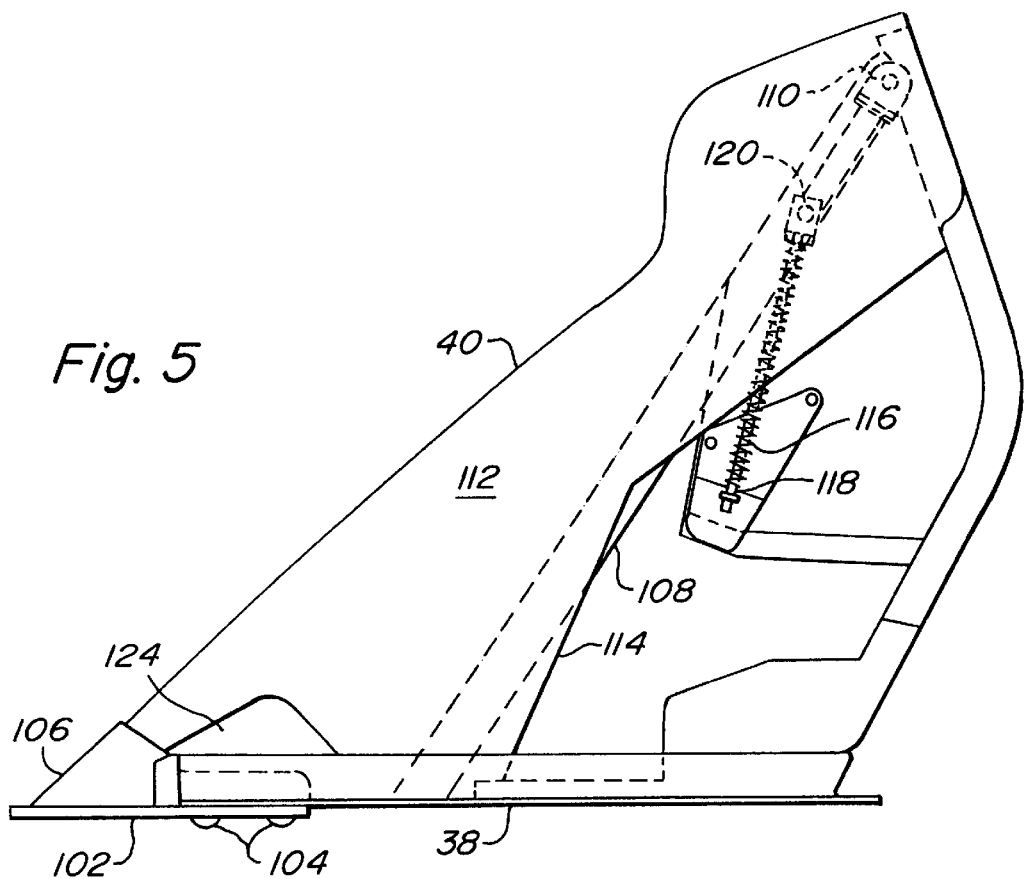
FIGS. 5 and 6 are side views of the end of the platform showing the divider cover in lower and upper positions respectively.
Figure 6:
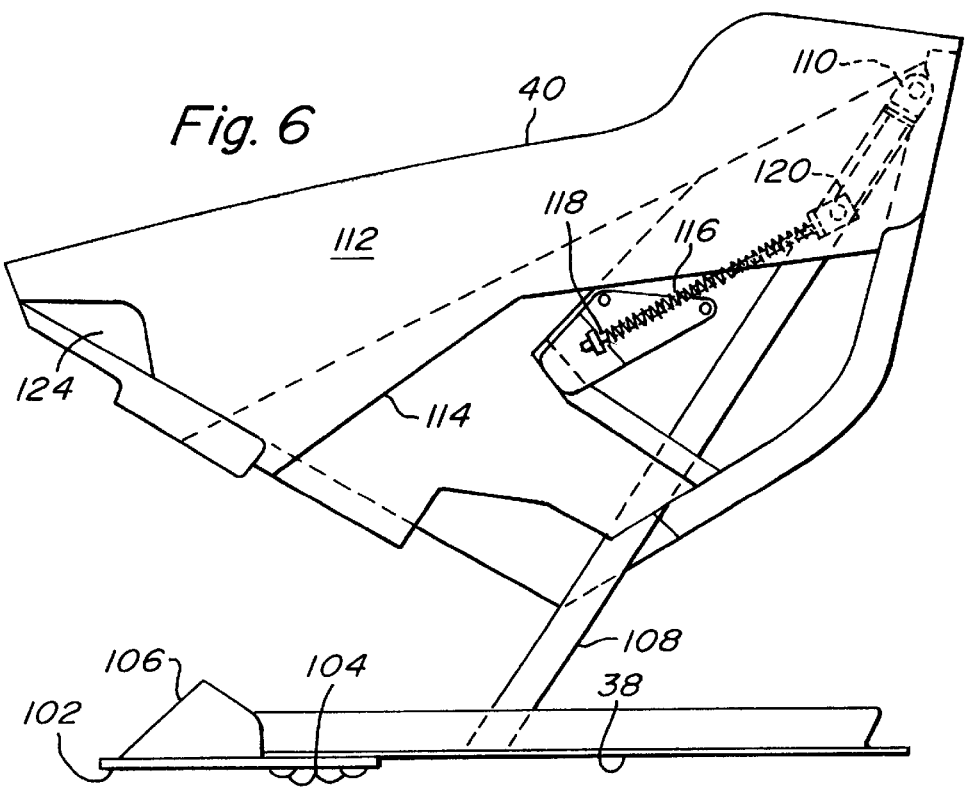

With reference to FIGS. 5 and 6, the divider is shown in greater detail. The divider includes a skid plate 38 that is coupled to the platform frame structure 12 in a conventional manner. A foot piece 102 is mounted to the skid plate 38 by removable fasteners 104. A point 106 rests on the foot piece 102. Other crop dividers can be attached to the foot piece if desired. The cover 40 is pivotally mounted to the skid plate 38 through a support post 108 that extends upwardly from the skid plate, inside the cover 40. The cover 40 is pinned to the upper end 110 of the support post 108 for rotation of the cover in a generally vertical plane.

The cover 40 is a generally U-shaped hollow body having an upright outer wall 92 and an inner wall 112. The inner and outer walls surround the support post 108 for the cover. The inner wall 112 has a cutout portion 114 at the rear lower end thereof through which the cutterbar assembly 18 extends into the cover 40.

The cover 40 is held against the skid plate in a lower position by an overcenter compression spring 116. The spring 116 is mounted on a rod 118 having one end 120 pivotally mounted to the support post 108 and the other end fixed to the cover 40. In FIG. 5, the cover 40 is in the lower position in which the compression spring 116 biases the cover downward against the skid plate 38. In FIG. 6, the cover 40 is in an upper position in which the spring 116 biases the cover upward. The spring passes over-center as the cover is moved between the lower and upper positions. The cover 40 has a recessed portion 124 in both the outer and inner walls 92, 112 near the point 106. These recessed portions form a handgrip to assist in lifting the cover 40 from the use position to the raised position.

The end knife guard of the cutterbar assembly 18, in cooperation with the divider cover 40, provides an exit passage for trash from the knife slot in the guard. This is accomplished by the inward taper in the outboard edge of the guard lower section. The taper provides a lower discharge open area while the divider cover remains close to the end of the cutterbar assembly.

The invention should not be limited to the above-described embodiment, but should be limited solely by the claims that follow.

I claim:

1. An end knife guard for a cutterbar assembly, the end knife guard comprising:

a body portion having a channel for receiving a knife back, the body portion having a lower section and an upper section in spaced relation so as to define a horizontal slot therebetween within which a respective knife section is confined and freely movable, the upper section and lower section being coupled at a forward end of the body portion;

a mounting portion integral with the body portion and extending rearwardly therefrom for mounting the guard to a support bar; and a guard portion integral with the body portion and extending forwardly from the forward end of the body portion; and wherein the lower section has a laterally inboard edge forming a cutting surface and a laterally outboard edge that tapers laterally inward from the forward end of the body portion toward the channel, thereby forming an open area for discharge of trash from the slot.

2. The end knife guard as defined by claim 1 wherein the lower section extends laterally outward beyond the upper section and further comprising a knife cover removably attached to the body portion adjacent the upper section and spanning over the lower section of the body portion.

3. The end knife guard as defined by claim 2 wherein the knife cover has an outboard edge that tapers outwardly and rearwardly from the forward end of the body portion whereby the knife cover extends outwardly beyond the outboard edge of the lower section.

4. The end knife guard as defined by claim 1 wherein the lower section further includes a secondary opening for trash to fall through.

5. A platform for a harvester comprising:

a frame structure having opposite ends;

a cutterbar assembly extending along a forward edge of the platform between the opposite ends;

crop dividers at the opposite ends of the frame structure, the crop dividers including a ground engaging skid plate and a divider cover that covers an end portion of the cutterbar assembly and forms an upright wall adjacent to the end of the cutterbar assembly;

the cutterbar assembly including an end knife guard having a body portion with a channel for receiving a knife back, the body portion having a lower section and an upper section in spaced relation so as to define a horizontal slot therebetween within which a respective knife section is confined and freely movable, the upper section and lower section being coupled at a forward end of the body portion, the lower section of the body portion having a laterally inboard edge that forms a cutting surface and a laterally outboard edge adjacent the upright wall that tapers laterally inward from the forward end of the body portion to the channel thereby forming an open area between the knife guard and the divider cover for discharge of trash at the end of the cutterbar assembly.

6. The platform as defined by claim 5 wherein the divider cover is pivotally mounted to the skid plate for rotation of the divider cover from a lower position in which the upright wall is adjacent the cutterbar assembly end to an upper position in which the upright wall is raised above the cutterbar assembly to gain access to the end portion of the cutterbar assembly.

7. The platform as defined by claim 6 further comprising an overcenter spring coupled to the divider cover for biasing the divider cover in both the lower and upper positions.

8. The platform as defined by claim 5 wherein the divider cover terminates at a forward lower end in a point and wherein the cover includes a recessed portion adjacent the point forming a handgrip.

* * * * *